US006986808B2

United States Patent
Fu et al.

(10) Patent No.: US 6,986,808 B2
(45) Date of Patent: Jan. 17, 2006

(54) INKJET INK COMPOSITIONS

(75) Inventors: Zhenwen Fu, Lansdale, PA (US); Louis Christopher Graziano, Doylestown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/731,510

(22) Filed: Dec. 9, 2003

(65) Prior Publication Data

US 2004/0118321 A1 Jun. 24, 2004

Related U.S. Application Data

(60) Provisional application No. 60/436,060, filed on Dec. 23, 2002.

(51) Int. Cl.
*C09D 11/00* (2006.01)

(52) U.S. Cl. .................... 106/31.59; 106/31.89

(58) Field of Classification Search ............ 106/31.59, 106/31.89
See application file for complete search history.

(56) References Cited

U.S. PATENT DOCUMENTS

| 5,466,281 A | * | 11/1995 | Hanke et al. ............ 106/31.28 |
| 5,512,623 A | * | 4/1996 | Loftin et al. ................ 524/462 |
| 5,698,016 A | | 12/1997 | Adams et al. |
| 5,711,790 A | | 1/1998 | Coller |
| 5,735,940 A | | 4/1998 | Coller |
| 5,769,931 A | * | 6/1998 | Wang et al. ............. 106/31.38 |
| 5,785,745 A | * | 7/1998 | Lauw et al. ............. 106/31.27 |
| 5,925,176 A | * | 7/1999 | Rehman .................. 106/31.43 |
| 5,935,309 A | * | 8/1999 | Moffatt et al. ........... 106/31.27 |
| 5,972,087 A | * | 10/1999 | Uraki et al. ............. 106/31.65 |
| 6,193,792 B1 | | 2/2001 | Fague |
| 6,255,383 B1 | | 7/2001 | Hanzlik |
| 6,444,017 B1 | | 9/2002 | Yue et al. |
| 6,602,333 B2 | * | 8/2003 | Miyabayashi ............ 106/31.27 |
| 6,749,675 B2 | * | 6/2004 | Momose ................... 106/31.58 |
| 2003/0100628 A1 | * | 5/2003 | Rygas et al. ................ 523/160 |
| 2004/0138334 A1 | * | 7/2004 | Rosenbaum et al. ........ 523/160 |
| 2004/0157957 A1 | * | 8/2004 | Ganapathiappan et al. . 523/160 |

FOREIGN PATENT DOCUMENTS

| EP | 0812888 A | 12/1997 |
| EP | 0947330 A | 10/1999 |
| EP | 0974627 A | 1/2000 |
| EP | 0978546 A | 2/2000 |
| EP | 0978546 A1 | 2/2000 |
| EP | 1180540 A1 | 2/2002 |
| EP | 1243625 A | 9/2002 |
| EP | 1270690 A | 1/2003 |
| WO | WO01/92431 | 12/2001 |

* cited by examiner

*Primary Examiner*—J. A. Lorengo
*Assistant Examiner*—Veronica F. Faison
(74) *Attorney, Agent, or Firm*—Karl Stauss

(57) ABSTRACT

Ink compositions having increased stability and increased jettability with the addition of specific surfactants, including alkyl ether sulfates and ethoxylated mercaptans, are provided. The remainder of the ink composition comprises a suitable carrier vehicle, which typically contains water, alcohols, surfactants, humectants and optionally a resin component.

9 Claims, No Drawings

INKJET INK COMPOSITIONS

CROSS REFERENCE TO RELATED PATENT APPLICATIONS

This is a non-provisional application of prior pending U.S. provisional application Ser. No. 60/436,060 filed Dec. 23, 2002.

This invention relates to inkjet inks. In particular, this invention relates to inks having increased stability and increased jettability with the addition of specific surfactants, including alkyl ether sulfates and ethoxylated mercaptans.

Ink jet printing is a well established technique for applying an ink to a substrate to form an image, in which there is no physical contact between the functional part of the printer from which the ink is applied and the substrate onto which the ink is deposited. The ink is applied in the form of micro-droplets, which are projected by well known means through small nozzles in the print head onto the substrate.

Ink Jet inks can contain colorants that are soluble in the ink vehicle (dyes) or colorants that are insoluble in the ink vehicle (pigments or dispersed dyes). A common problem associated with insoluble colorants is that over time increases in particle size can occur resulting in decreased jetting characteristics. An additional problem when jetting insoluble colorants is clogging of the jet nozzle over time resulting in misdirected droplets or total loss drop ejection. This is especially problematic when the inks are formulated with binders or other polymers.

U.S. Pat. No. 5,698,016 describes compositions useful as dispersions and inks, made of an amphiphilic ion and a modified carbon product having organic groups attached to it, wherein the organic groups and amphiphilic ions have opposite charges. The intermediate step of attaching organic groups to the carbon is necessary to provide water dispersibility. Stabilizing a broad range of ink compositions is not disclosed.

European Patent Application 0978546 A1 describes ink compositions comprising a combination of an ammonium carboxylate salt and one or more surfactants, preferably non-ionic ethoxylated surfactants, hydroxylated or alkoxylated acetylenic polyethylene oxide surfactants, or anionic phosphate esters. The ability to achieve stability with these surfactants without an ammonium carboxylate present is not disclosed.

The problem addressed by the present invention is to provide an aqueous inkjet ink having improved stability and jetting ability in inkjet printers without relying on multiple stabilization mechanisms to achieve desired properties. Another problem addressed by the present invention is to provide an aqueous inkjet ink having improved jetting ability for any stable ink.

The present invention provides an ink composition comprising a liquid medium, a colorant and at least 0.1% by weight of the ink of an amphiphilic material having the formula R—O—$Q_n$A$^-$M$^+$ where R represents an alkyl, aryl, akyl-aryl or alkenyl group; Q represents a hydrophilic repeating unit of ethylene oxide or propylene oxide, wherein n>4; A$^-$ represents a sulfate, sulfonate or phosphate group; M$^+$ represents a cation such as potassium, sodium, lithium or ammonium; and where if the colorant is a modified carbon black with organic groups covalently bonded thereto, the amphiphilic material has the same charge as the modified carbon black.

The present invention further provides an ink composition comprising a liquid medium, a colorant and at least 0.1% by weight of the ink of an amphiphilic material having the formula XQ$_n$R'—Y—R where X represents hydroxyl or amino functionality; Q represents a hydrophilic repeating unit of ethylene oxide or propylene oxide, wherein n>4; R' represents $C_1$ to $C_6$ alkyl functionality; Y represents oxygen, nitrogen or sulfur; and R represents an alkyl, aryl, alkyl-aryl or alkenyl group.

Surprisingly, the addition of specific amphiphilic materials improve the stability of the ink, where the specific amphiphilic materials have the formula R—O—$Q_n$A$^-$M$^+$ where R represents an alkyl, aryl, akyl-aryl or alkenyl group; Q represents a hydrophilic repeating unit of ethylene oxide or propylene oxide, wherein n>4; A$^-$ represents a sulfate, sulfonate or phosphate group and M$^+$ represents a cation such as potassium, sodium, lithium or ammonium.

Addition of a second amphiphilic material improves the jettability of the ink wherein the second amphiphilic material has the formula XQ$_n$R'—Y—R where X represents hydroxyl or amino functionality; Q represents a hydrophilic repeating unit of ethylene oxide or propylene oxide, wherein n>4; R' represents $C_1$ to $C_6$ alkyl functionality; Y represents oxygen, nitrogen or sulfur and R represents an alkyl, aryl, akyl-aryl or alkenyl group.

Useful amphiphilic materials of the formula, R—O—$Q_n$A$^-$M$^+$ include, without limitation, the sodium salts of fatty alcohol ether sulfates and sodium salts of alkyl phenyl ether sulfates, such as sodium laureth sulfate and the Disponil™ FES and Disponil™ AES surfactants provided by Cognis. Additional amphiphilic materials of the formula, R—O—$Q_n$A$^-$M$^+$ include, without limitation, alkyl, aryl or alkenyl ether phosphates; alkyl, aryl or alkenyl ether sulfates; and salts of the foregoing, including sodium, potassium, ammonium and lithium salts; and combinations thereof.

Useful amphiphilic materials of the formula XQ$_n$R'—Y—R include, without limitation, alkyl, aryl or alkenyl mercaptan ethoxylates, such as Alcodet™ HSC, Alcodet™ MC, Alcodet™ SK, Alcodet™ 260 and Alcodet™ 218 brand surfactants by Rhodia, located in France, or alky phenol ethoxylates, such as Rhodafac™ RM-510 and Rhodafac™ RM-710 brand surfactants by Rhodia, located in France.

Inkjet ink compositions include a liquid medium, a colorant and additional stabilizing components. The liquid medium is typically predominantly water, preferably deionized water. The inkjet ink composition includes a colorant which can be a pigment or dye. The pigment may be an organic pigment or an inorganic pigment. "Organic pigment" means a pigment which is predominantly an organic compound or mixture of organic compounds, including carbon black.

Suitable organic pigments include, for example, surface modified and unmodified, anthroquinones, phthalocyanine blues, phthalocyanine greens, diazos, monoazos, heterocyclic yellows, pyranthrones, quinacridone pigments, dioxazine pigments, indigo, thioindigo pigments, perynone pigments, perylene pigments, isoindolene, polymer particles having at least one void, and the like. Carbon black is the generic name for small particle size carbon particles formed in the gas phase by the thermal decomposition of hydrocarbons and includes, for example, materials known in the art as furnace black, lampblack, channel black, acetylene black. Carbon black additionally encompasses treated, modified, and oxidized carbon black.

Suitable inorganic pigments include titanium dioxide, iron oxide, and other metal powders. Generally, the amount of pigment(s) used is less than 20%, preferably 3–8%, more preferably 2–6% by weight based on the total weight of the ink. The ink composition of the present invention preferably includes the emulsion polymer at a level of 0.1 to 25%, more preferably 1 to 20%, by weight based on the total weight of the ink composition. The ink composition may also include water miscible or soluble materials such as polymers, humectants, dispersants, penetrants, chelating agents, co-solvents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol with average molecular weight of 200, 300, 400, 600, 900, 1000, 1500 and 2000, dipropylene glycol, polyproylene glycol with average molecular weight of 425, 725, 1000, and 2000, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 400 to 1000, 2-pyrrolidone 2,2-thiodiethanol, and 1,5-pentanediol. Preferred penetrants include n-propanol, isopropyl alcohol, 1,3-propanediol, 1,2-hexanediol, and hexyl carbitol.

The amount of humectant used is determined by the properties of the ink and may range from 1–30%, preferably 5–15%, by weight, based on the total weight of the ink. Examples of commonly used humectants useful in forming the ink are: glycols, polyethylene glycols, glycerol, ethanolamine, diethanolamine, alcohols, and pyrrolidones. Other humectants known in the art may be used as well.

The use of suitable penetrants will depend on the specific application of the ink. Useful examples include pyrrolidone, and N-methyl-2-pyrrolidone. In a preferred embodiment in a inkjet ink composition containing more than 20%, on an equivalents basis, of hydroxy, amino, or thiol functionality relative to the hydroxy functionality of the emulsion polymer, the hydroxy, amino, or thiol functionality being present in, for example, penetrants, humectants, surfactants, etc., that such ingredients have a boiling point less than 220° C., preferably less than 200° C.

The amount of defoaming agent in the ink will typically range from 0–0.5% by weight, based on the total weight of the ink. Defoaming agents useful in forming aqueous dispersions of pigments are well known in the art and commercially available examples include Surfynol 104H and Surfynol DF-37 (Air Products, Allentown, Pa.).

In embodiments wherein methylol acrylamide or methylol methacrylamide is included in the copolymer, a catalyst which is a latent source of acidity, that is, a compound effective to lower the pH of the coating composition under the drying and curing conditions disclosed below, is included in the coating composition, preferably in an amount effective to provide a coating composition having a pH from about 1 to about 4.

The catalyst, which may be used at a level of 0 to 10%, preferably 0.1% to 10%, more preferably 0.5% to 6%, most preferably 3% to 6%, by weight based on the weight of the ink composition includes, for example, ammonium chloride, ammonium nitrate, ammonium citrate, diammonium phosphate, magnesium chloride, amine salts of p-toluene sulfonic acid and mixtures thereof.

The ink compositions of the present invention may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

The ink composition of the present invention is applied by one of the ink-jet techniques known in the art using, for example, thermal or bubble jet printers, piezoelectric printers, continuous flow printers, air brush or valve jet printers, to a substrate. Preferred substrates are fabrics, either woven or nonwoven, which may be formed from suitable fibers such as, for example, cotton, polyester, aramid, silk, acrylic, wool, rayon, nylon, polyamide, and glass. Any suitable substrate may be utilized, including paper, vinyl, leather and polyester. The ink composition may also be cured after application, i.e., dried and crosslinked, at a selected time and temperature, times from 1 second to 10 minutes and temperatures from 60° C. to 300° C. being typical. It is understood that shorter cure times will ordinarily require higher temperatures to effect cure. The cure may be effected by combinations of thermal and radiation energy, such as microwave or infrared radiation.

For the purposes of this invention ink stability is defined as an increase in particle size after five days at 60° C. of not more than 70 nm, using a Microtrac UPA 150 Particle Size Analyzer from Microtrac, Inc., Montgomeryville, Pa., U.S.A.

The jetting ability or jettability of an ink is demonstrated as an increase in jetting time without misdirection or clogging of the ink jet nozzles. The jettability test is conducted by printing a cotton fabric continuously with a Model JF-0604 printer manufactured by Mimaki Engineering Company, Ltd., Japan, until clogged jets or misdirected droplets are observed.

The following examples are illustrative of the invention.

EXAMPLE 1

Ink Formulations with Improved Stability

The ink compositions shown in Tables 1 and 3 are made by blending all of the ingredients together except for the binder and the pigment dispersions. The pH value of the mixture is adjusted to be 8 to 8.5 using 14% ammonium hydroxide. The binder emulsion is then added to the mixture gradually while stirring. The pigment dispersion is added last to the above mixture gradually while stirring. The final pH of the inks is adjusted to be 8.5 using 14% ammonium hydroxide. The final inks are filtered using a 1 micron fiberglass filter (made by Pall Corporation, Ann Arbor, Mich. 48103, USA). The viscosity is measured using a BrookField viscometer (made by Brookfield ENG LABS INC., Stoughton, Mass. 02072, USA) at 30 rpm with Ultra Low (UL) Adapter and spindle. The Surface tension is measured using Fisher Scientific surface tensiometer 20 (made by Fisher Scientific, USA).

The stability and the shelf life time are assessed by heat-aging at 60° C. and making particle size measurements. The initial particle size is measured after the ink is filtered before any heat-aging and at specific heat-aging times at 60° C. The particle size measurements are made using a Microtrac UPA 150 Particle Size Analyzer (made by Microtrac Inc. Montgomeryville, Pa. 18936).

TABLE 1

Ink Formulations With Improved Stability

| Material ID | 1 (%) | 2 (%) | 3 (%) | 4 (%) | 5 (%) | 6 (%) |
|---|---|---|---|---|---|---|
| Colorant (AcryJet ™ Magenta 127) | 20.00 | 20.00 | 20.00 | 20.00 | 20.00 | 20.00 |
| Latex binder (42%) | 14.29 | 14.29 | 14.29 | 14.29 | 14.29 | 14.29 |
| SLS (28%) | 3.57 | | | | | |
| DS4 (23%) | | 3.57 | | | | |
| FES-61 (30%) | | | 3.57 | | | |
| FES-77 (30%) | | | | 3.57 | | |
| FES-993 (30%) | | | | | 3.57 | |
| FES-32 (30%) | | | | | | 3.57 |
| Ammonium Nitrate (25% in Water) | 1.00 | 1.00 | 1.00 | 1.00 | 1.00 | 1.00 |
| 2-Pyrrolodinone | 5.00 | 5.00 | 5.00 | 5.00 | 5.00 | 5.00 |
| Ethylene Glycol | 10.00 | 10.00 | 10.00 | 10.00 | 10.00 | 10.00 |
| 1,3-propanediol | 5.00 | 5.00 | 5.00 | 5.00 | 5.00 | 5.00 |
| Surfynol ™ 465 | 1.20 | 1.20 | 1.20 | 1.20 | 1.20 | 1.20 |
| DI Water | 39.94 | 39.95 | 39.95 | 39.95 | 39.95 | 39.95 |
| Total | 100.00 | 100.00 | 100.00 | 100.00 | 100.00 | 100.00 |

Samples 1 and 2 are comparative samples.
AcryJet ™ is a trademark of the Rohm and Haas Company, Philadelphia, PA, U.S.A. DS-4 is an alkyl aryl sulfonate surfactant sold under the trademark Rhodocal ™ DS-4 from Rhodia, France. SLS is sodium lauryl sulfate sold under the trademark Polystep ™ S-1 from Stepan Company, Northfield, IL, U.S.A. FES brand products are provided by Cognis.

TABLE 2

Ink Properties For Ink Formulations In Table 1

| Ink Properties | 1 | 2 | 3 | 4 | 5 | 6 |
|---|---|---|---|---|---|---|
| PH | 8.80 | 8.82 | 8.79 | 8.81 | 8.79 | 8.80 |
| Viscosity (cp) | | | 4.92 | 4.60 | | |
| Surface tension (dyne/cm) | | | 35.10 | 34.80 | | |
| Particle Size (nm) | | | | | | |
| Initial | 202 | 199 | 165 | 164 | 172 | |
| 5 day@ 60 C | 595 | 564 | 168 | 196 | 217 | 309 |
| 12 day@ 60 C | | | 167 | 225 | | |
| 25 day@ 60 C | | | 197 | 280 | | |
| 153 day@ 60 C | | | 223 | 368 | | |

Samples F3–F6 exhibit improved stability as compared to samples F1–F2.

TABLE 3

Ink Formulations With Improved Stability

| Material ID | 7 (%) | 8 (%) | 9 (%) | 10 (%) | 11 (%) | 12 (%) | 13 (%) |
|---|---|---|---|---|---|---|---|
| Colorant (AcryJet Magenta 127) | 20.00 | 20.00 | 20.00 | 22.00 | 20.00 | 20.00 | 20.00 |
| Latex binder (42%) | 14.29 | 14.29 | 14.29 | 9.00 | 14.29 | 14.29 | 14.29 |
| SLS (28%) | 3.57 | | | | | | |
| DS4 (23%) | | 3.57 | | | | | |
| FES-61 (30%) | | | 3.57 | 4.33 | | | |
| FES-77 (30%) | | | | | 3.57 | | |
| FES-993 (30%) | | | | | | 3.57 | |
| FES-32 (30%) | | | | | | | 3.57 |
| Ammonium Nitrate (25% in Water) | 1.00 | 1.00 | 1.00 | 2.00 | 1.00 | 1.00 | 1.00 |
| 2-Pyrrolodinone | 5.00 | 5.00 | 5.00 | 8.00 | 5.00 | 5.00 | 5.00 |
| Ethylene Glycol or Diethylene Glycol | 10.00 | 10.00 | 10.00 | 10.00 | 10.00 | 10.00 | 10.00 |
| 1,3-propanediol | 5.00 | 5.00 | 5.00 | 0.00 | 5.00 | 5.00 | 5.00 |
| Alcodet-sk | 1.20 | 1.20 | 1.20 | 1.30 | 1.20 | 1.20 | 1.20 |
| DI Water | 39.94 | 39.95 | 39.95 | 43.37 | 39.95 | 39.95 | 39.95 |
| Total | 100.00 | 100.00 | 100.00 | 100.00 | 100.00 | 100.00 | 100.00 |

Samples 7 and 8 are comparative samples.
Alcodet ™ SK is an alkyl mercaptan ethoxylate (8 EO) by Rhodia, located in France.

TABLE 4

Ink Properties For Ink Formulations In Table 3

| Ink Properties | 7 | 8 | 9 | 10 | 11 | 12 | 13 |
|---|---|---|---|---|---|---|---|
| PH | 8.89 | 8.88 | 8.89 | 8.40 | 8.88 | 8.89 | 8.89 |
| Viscosity (cp) | | | 4.90 | 3.75 | 3.62 | 3.98 | |
| Surface tension (dyne/cm) | | | 35.30 | 34.50 | 34.80 | 35.30 | |
| Particle Size (nm) | | | | | | | |
| Initial | 213 | 261 | 165 | 157 | 164 | 185 | 186 |
| 5 day@ 60 C | 671 | 361 | 144 | 169 | 168 | 178 | 240 |
| 12 day@ 60 C | | | 177 | 178 | 207 | 195 | |
| 25 day@ 60 C | | | 182 | 165 | 206 | 230 | |
| 153 day@ 60 C | | | 187 | | 241 | 268 | |

Ink samples 3–6 exhibit excellent stability with fair jettability. Ink samples 9–13 exhibit excellent stability and excellent jettability.

EXAMPLE 2

Ink Formulations with Improved Jettability

The ink compositions shown in Table 5 are made by blending all of the ingredients together except for the binder and the pigment dispersions. The pH value of the mixture is adjusted to be 8 to 8.5 using 14% ammonium hydroxide. The binder emulsion is then added to the mixture gradually while stirring. The pigment dispersion is added last to the above mixture gradually while stirring. The final pH of the inks is adjusted to be 8.5 using 14% ammonium hydroxide. The final inks are filtered using a 1 micron fiberglass filter (made by Pall Corporation, Ann Arbor, Mich. 48103, USA). The viscosity is measured using a BrookField viscometer (made by Brookfield ENG LABS INC., Stoughton, Mass. 02072, USA) at 30 rpm with Ultra Low (UL) Adapter and spindle. The Surface tension is measured using Fisher Scientific surface tensiometer 20 (made by Fisher Scientific, USA).

TABLE 5

Ink Formulations With Improved Jettability

| Material ID | 14 (%) | 15 (%) | 16 (%) | 17 (%) | 18 (%) | 19 (%) |
|---|---|---|---|---|---|---|
| Colorant (Cab-O-Jet ™ 300) | 25.00 | 25.00 | 25.00 | — | — | — |
| Colorant (Cab-O-Jet ™ 250) | — | — | — | 25.00 | 25.00 | 25.00 |
| Latex binder (42%) | 14.29 | 14.29 | 14.29 | 9.00 | 14.29 | 14.29 |
| Ammonium Nitrate (25% in Water) | 1.00 | 1.00 | 1.00 | 2.00 | 1.00 | 1.00 |
| 2-Pyrrolodinone | 5.00 | 5.00 | 5.00 | 8.00 | 5.00 | 5.00 |
| Ethylene Glycol or Diethylene Glycol | 10.00 | 10.00 | 10.00 | 10.00 | 10.00 | 10.00 |
| 1,3-propanediol | 5.00 | 5.00 | 5.00 | 0.00 | 5.00 | 5.00 |
| Surfynol ™ 465 | 1.20 | — | — | 1.20 | — | — |
| Alcodet-sk | — | 1.20 | 1.20 | — | 1.20 | 1.20 |
| DI Water | 38.51 | 38.51 | 38.51 | 38.51 | 38.51 | 38.51 |
| Total | 100.00 | 100.00 | 100.00 | 100.00 | 100.00 | 100.00 |

Cab-O-Jet ™ is a trademark of Cabot Corporation, Billerica, MA U.S.A.
Samples 14 and 17 are comparative samples.
Ink samples 15, 16, 18 and 19 will exhibit improved jettability versus ink samples 14 and 17.

What is claimed is:

1. An ink composition comprising:
    (a) a liquid medium;
    (b) a pigment;
    (c) at least 0.1% by weight of the ink of an amphiphilic material having the formula $R-O-Q_n A^- M^+$ where R represents an alkyl, aryl, akyl-aryl or alkenyl group;
    Q represents a hydrophilic repeating unit of ethylene oxide or propylene oxide, wherein n>4;
    $A^-$ represents a sulfate, sulfonate or phosphate group;
    $M^+$ represents a cation such as potassium, sodium, lithium or ammonium;
    and where if the pigment is a modified carbon black with organic groups covalently bonded thereto, the amphiphilic material has the same charge as the modified carbon black; and at least 0.1% by weight of the ink of a second amphiphilic material, where the second amphiphilic material has the formula $XQ_nR'—Y—R$ where X represents hydroxyl or amino functionality;
Q represents a hydrophilic repeating unit of ethylene oxide or propylene oxide, wherein n>4;
R' represents $C_1$ to $C_6$ alkyl functionality;
Y represents oxygen, nitrogen or sulfur, and
R represents an alkyl, aryl, alkyl-aryl or alkenyl group.

2. The ink composition of claim 1 where the second amphiphilic material is one or more compositions selected from the group of (a) alkyl, aryl, alkyl-aryl or alkenyl mercaptan ethoxylates and (b) alky phenol ethoxylates.

3. The ink composition of claim 1 wherein the ink comprises no more than 10% of the second amphiphilic material on a weight basis.

4. An ink composition comprising:
(a) a liquid medium;
(b) a pigment;
(c) at least 0.1% by weight of the ink of an amiphiphilic material having the formula $XQ_nR'—Y—R$ where X represents hydroxyl or amino functionality;
Q represents a hydrophilic repeating unit of ethylene oxide or propylene oxide, wherein n>4;
R' represents $C_1$ to $C_6$ alkyl functionality;
Y represents oxygen, nitrogen or sulfur; and
R represents an alkyl, aryl, alkyl-aryl or alkenyl group; and at least 0.1% by weight of the ink of a second amphiphilic material, where the second amphiphilic material has the formula $R—O—Q_nA^-M^+$ where R represents an alkyl, aryl, akyl-aryl or alkenyl group;
Q represents a hydrophilic repeating unit of ethylene oxide or propylene oxide, wherein n>4;
$A^-$ represents a sulfate, sulfonate or phosphate group; and
$M^+$ represents a cation such as potassium, sodium, lithium or ammonium.

5. The ink composition of claim 4 where the second amphiphilic material is one or more compositions selected from the group of (a) alkyl, aryl, alkyl-aryl or alkenyl ether phosphates and salts thereof, including sodium, potassium, ammonium and lithium salts; and (b) alkyl, aryl, alkyl-aryl or alkenyl ether sulfates and salts therof, including sodium, potassium, ammonium and lithium salts.

6. An ink composition comprising a liquid medium, a pigment and at least 0.1% by weight of the ink of an amphiphilic material having the formula $R—O—Q_nA^-M^+$ where R represents an alkyl, aryl, alkyl-aryl or alkenyl group;
Q represents a hydrophilic repeating unit of ethylene oxide or propylene oxide, wherein n is at least 50;
$A^-$ represents a sulfate, sulfonate or phosphate group;
$M^+$ represents a cation such as potassium, sodium, lithium or ammonium;

and where if the pigment is a modified carbon black with organic groups covalently bonded thereto, the amphiphilic material has the same charge as the modified carbon black.

7. The ink composition of claim 4 wherein n of the second amphiphilic material is at least 11.

8. The ink composition of claim 4 wherein n of the second amphiphilic material is at least 30.

9. The ink composition of claim 4 wherein n of the second amphiphilic material is at least 50.

* * * * *